(12) United States Patent
Silberschmidt et al.

(10) Patent No.: US 12,097,931 B2
(45) Date of Patent: Sep. 24, 2024

(54) AIR RELEASE UNIT WITH DIVERGING SIDE WALLS

(71) Applicant: SILVERSTREAM TECHNOLOGIES B.V., Amstelveen (NL)

(72) Inventors: Noah Silberschmidt, London (GB); Jørgen Clausen, London (GB); Johannes Johannesson, Espergaerde (DK)

(73) Assignee: Silverstream Technologies B.V., Amstelveen (NL)

( * ) Notice: Subject to any disclaimer, the term of this patent is extended or adjusted under 35 U.S.C. 154(b) by 455 days.

(21) Appl. No.: 17/611,401

(22) PCT Filed: May 15, 2020

(86) PCT No.: PCT/NL2020/050313
§ 371 (c)(1),
(2) Date: Nov. 15, 2021

(87) PCT Pub. No.: WO2020/231264
PCT Pub. Date: Nov. 19, 2020

(65) Prior Publication Data
US 2022/0234687 A1 Jul. 28, 2022

(30) Foreign Application Priority Data
May 16, 2019 (NL) ...................................... 2023149

(51) Int. Cl.
*B63B 1/38* (2006.01)
(52) U.S. Cl.
CPC .......... *B63B 1/38* (2013.01); *B63B 2001/387* (2013.01)
(58) Field of Classification Search
CPC ............................ B63B 1/38; B63B 2001/387
See application file for complete search history.

(56) References Cited

U.S. PATENT DOCUMENTS

| | | | |
|---|---|---|---|
| 5,456,201 A * | 10/1995 | Bobst | B63B 1/38 |
| | | | D12/318 |
| 6,293,216 B1 * | 9/2001 | Barsumian | B63B 1/322 |
| | | | 114/67 A |

(Continued)

FOREIGN PATENT DOCUMENTS

| | | | | |
|---|---|---|---|---|
| CN | 1068300 A | * | 1/1993 | ............. B60V 1/046 |
| EP | 1 361 150 | | 11/2003 | |

(Continued)

OTHER PUBLICATIONS

International Search Report for PCT/NL2020/050313, mailed Aug. 18, 2020, 3 pages.

(Continued)

*Primary Examiner* — S. Joseph Morano
*Assistant Examiner* — Jovon E Hayes
(74) *Attorney, Agent, or Firm* — N.V. Nederlandsch Octrooibureau

(57) ABSTRACT

Disclosed is a vessel including a hull and a system providing an air lubricating layer between the bottom and water, including a cavity defined by sidewalls, a top wall and an interface plane, in which water mixes with air due the Kelvin Helmholtz effect. The sidewalls extend from a dagger-shaped nose section at the front end to the rear end of the cavity and diverge so a distance between the sidewalls increases along the length of the cavity when going in a rearward direction. The diverging cavities provide a stable air lubrication layer that covers a relatively large area of the bottom, so the number of cavities can be reduced. The alignment of the diverging cavities with the streamlines has relatively large tolerances so construction is simplified and can be carried out in a cost-effective manner. The diverging sidewalls lead to reduced formation of vortices and reduced drag.

20 Claims, 4 Drawing Sheets

(56) References Cited

U.S. PATENT DOCUMENTS

| | | | |
|---|---|---|---|
| 9,862,459 B2 * | 1/2018 | Johannnesson | B63B 1/38 |
| 10,029,770 B2 * | 7/2018 | Johannesson | B63B 1/38 |
| 2003/0154897 A1 * | 8/2003 | Burg | B63B 1/38 114/67 A |
| 2015/0298767 A1 * | 10/2015 | Johannesson | B63B 1/38 114/63 |
| 2022/0234687 A1 * | 7/2022 | Silberschmidt | B63B 1/38 |

FOREIGN PATENT DOCUMENTS

| | | | | |
|---|---|---|---|---|
| EP | 3290324 A1 * | 3/2018 | | B63B 1/38 |
| WO | WO-0136263 A1 * | 5/2001 | | B60V 1/08 |
| WO | 2015/133899 | 9/2015 | | |
| WO | WO-2015133899 A1 * | 9/2015 | | B63B 1/38 |

OTHER PUBLICATIONS

Written Opinion of the ISA for PCT/NL2020/050313, mailed Aug. 18, 2020, 5 pages.

* cited by examiner

AIR RELEASE UNIT WITH DIVERGING SIDE WALLS

This application is the U.S. national phase of International Application No. PCT/NL2020/050313 filed 15 May 2020, which designated the U.S. and claims priority to NL Patent Application No. 2023149 filed 16 May 2019, the entire contents of each of which are hereby incorporated by reference.

FIELD OF THE INVENTION

The invention relates to an air lubricated vessel and to an air cavity, also referred to as "air release unit", wherein the vessel comprises a hull with a bottom and an air lubricating system for providing an air lubricating layer between the bottom and water flowing along the bottom as the vessel is moving through the water. The air lubricating system comprises at least one cavity defined by sidewalls, a top wall and an interface plane that is situated at a distance from the top wall, and that extends transversely to the sidewalls, substantially at the level of the bottom, the cavity having a front end, a rear end and a length Lc extending in a length direction of the cavity, with an air inlet spaced from the opening of the cavity.

BACKGROUND OF THE INVENTION

Such a system and vessel are known from WO 2015/133899, filed in the name of the applicant. In this publication, it is described that efficient air lubrication of a flat bottom of a vessel is achieved by providing a relatively small-sized open cavity and injecting air into the cavity at about hydrostatic pressure, such that a substantially flat water-air interface is formed at the height of the bottom. At this interface, air is mixed into the water due to the occurrence of Kelvin Helmholtz instability, and a stream of air bubbles escapes from the rear of the cavity. Such cavities were found to provide a stable and efficient manner of providing a layer of bubbles that are contained in the boundary layer along the bottom, reducing frictional drag such that the energy gain because of reduced friction during propulsion by far outweighs the extra energy required for injecting air at hydrostatic pressures into the cavity. Using an air lubricating system, reductions in fuel consumption of up to 10% may be realised.

In order to facilitate emptying of the cavity during start up, on or more deflectors may be used that extend transversely across the cavity. The deflector reduces turbulence inside the cavity and causes air to be retained inside the cavity for a longer period of time such that compressors of reduced capacity for less powerful air injection during start up are required.

It is an object of the present invention to provide an air lubrication system and an air release unit of the type described above which has improved efficiency and utilises a relatively low amount of energy to lubricate the hull. It is a further object of the present invention to improve the stability of the air lubrication and of the air release from the cavities. It is another object of the invention to provide an air lubrication system in which the installation of the cavities in the bottom of the hull can be simplified.

SUMMARY OF THE INVENTION

Hereto an air cavity vessel according to the present invention comprises at least one cavity defined by sidewalls, a top wall and an interface plane that is situated at a distance Hc from the top wall and that extends transversely to the sidewalls substantially at the level of the bottom, the cavity having a front end, a rear end and at its rear end a width Wr, wherein the ratio Lc/Hc is in the range 6:1 to 15:1, the ratio Wr/Hc is in the range of 1.3:1 to 5:1 and the ratio Lc/Wr is in the range of 3.5:1 to 7:1, the length Lc being between 2 m and 10 m, preferably between 4 m and 8 m, wherein the sidewalls extend from a nose section at the front end, in which the sidewalls touch, to a transition zone that is situated at a distance Lt from the front end, the sidewalls between the rear end and the transition zone extending at an angle relative to the length direction of the cavity such that a distance between the sidewalls increases along the length of the cavity when going in a rearward direction.

With "transition zone", as defined herein, the boundary is meant along the length of the cavity between the converging sidewalls of the nose section and the sidewall parts of the cavity that extend towards the rear end of the cavity.

By the diverging sidewalls of the relatively small-sized air lubricating cavity according to the invention, the bubbles will exit the cavity with a wider tail which results in a more efficient covering of the bottom of the hull with air bubbles. Hereby the bottom can be lubricated using a smaller number of air lubricating cavities, for instance 12 instead of 14. With the cavities according to the invention, a reduction in energy consumption for air lubrication of about 15% could be achieved compared to the known air lubrication system described in WO 2015/133899, in which the sidewalls that extend from the transition zone towards the rear end, are placed in parallel.

By the diverging sidewalls according to the invention, it has appeared that the length direction of the cavity may deviate from the direction of the flowlines at the position of the cavity while still achieving a stable air bubble release that is less sensitive to the direction of the flow. This allows a larger freedom of installation of the air cavities and placing their length direction at an angle with respect to the flow lines. This enables installation of the cavities parallel to the ship structural parts such as longitudinal beams, bulkheads and reinforcement structures since the cavities according to the present invention need not be perfectly aligned with the flowlines. This greatly simplifies the process of construction of newly built vessels and/or retrofitting existing vessels by cutting a hole in the bottom for receiving a cavity unit therein.

It was also found that the diverging sidewalls of the air cavity according to the present invention reduced the vortices formed at the rear end of the cavity, thereby reducing drag and increasing the efficiency of the lubrication.

Preferably the nose end is substantially V-shaped or dagger-shaped. A dagger-shaped nose has the advantage that formation of waves inside the cavity at the free surface is prevented.

It should be noted that a large sized V-shaped air cavity in a high-speed surface-effect vessel is known from European patent application EP 0 667 282. The known cavity extends over more than half the length of the vessel, all the way up to the stern. The known air cavity is not suitable for controlled release of air bubbles that are formed by Kelvin-Helmholtz mixing of air and water at the cavity interface plane and that cling to the downstream part of the bottom after leaving the cavity.

The transit position Lt may be situated at a distance of between 1 m and 2 m from the front end, preferably between 1.2 m and 1.8 m.

In an embodiment of a vessel according to the invention, an air inlet is provided in the top wall, at a length position that substantially corresponds to the transit position Lt. This was found to give the best air distribution inside the cavity, giving the least pressure difference inside the cavity and the least disturbance of the air-water interface.

In an embodiment of a vessel according to the invention, a distance Wr between the sidewalls near the rear end is between 70 cm and 150 cm, preferably between 80 cm and 120 cm, and wherein a distance Wt between the sidewalls at the transition zone is between 40 and 70 cm, preferably between 45 and 60 cm.

The compact size of the air cavities according to the invention provide a stable and efficient air lubrication.

Preferably, the rear wall of the cavity slopes downward from the top surface to be tangential with the interface plane over a rear wall length Lr of between 50 cm and 2 m, preferably between 1 m and 1.5 m.

The sloping rear wall ends at the interface plane and forms a wedge-shaped release section from which the air/water mixture can exit the cavity in a controlled manner to evenly spread across the downstream bottom part. Preferably the bottom section downstream of the cavities is substantially flat so that the bubbles cling to the bottom and do not have the possibility of moving upwards towards the water surface.

A deflector may be situated substantially parallel to the interface plane at a distance between 1 cm and 50 cm from the interface plane, the deflector having sidewalls substantially parallel to the sidewalls of the cavity and extending at a distance of between 1 cm and 10 cm from the sidewalls. By the deflector, the cavity can be rapidly filled with air upon start up. In use, waves are prevented from entering the cavity by the deflector and emptying the cavity of air is prevented, so that the stability of the cavity is increased. The deflectors may be laid-out according to WO 2013/125951, WO 2015/133899 or WO 2018/044163, that were filed in the name of the applicant.

In a preferred embodiment according to the invention, the vessel comprises streamlines along its bottom, and has on each side of a centre line two or more cavities at different width positions across the bottom, each cavity being situated with its length direction at an angle to the streamline at the position of the cavity, of between 0.01° and 7°, preferably between 0.01° and 5°.

The design of the cavity according to the invention including the diverging sidewalls, makes the cavities less sensitive to the direction of water flow. It is therefore possible to place the cavity according to the invention not exactly aligned with the streamlines along the bottom of the vessel but to align the cavities with the vessel's internal reinforcement structures, such as bulkheads and beams. Hereby, the design and placement of the cavities is simplified and construction of the cavities is made more cost effective.

A vessel according to the invention may comprise two cavities in the length direction on each side of the centre, line, wherein, when seen in the length direction, a distance between the front ends of a forward cavity that is placed nearest to a bow of the vessel and a cavity that placed nearer to the stern, is between 4 m and 10 m.

The cavities can be spaced apart at a relatively large distance in the length direction of the vessel, while still covering the entire bottom, which is preferably flat, with air bubbles. Also, the tail of bubbles that is released from the cavities is relatively wide, so that a large area coverage of the air bubble layer is achieved using reduced amounts of air.

BRIEF DESCRIPTION OF THE DRAWINGS

Some embodiments of a vessel according to the present invention will by way of non-limiting example be described in detail with reference to the accompanying drawings. In the drawings.

DETAILED DESCRIPTION OF THE INVENTION

Figure 1:
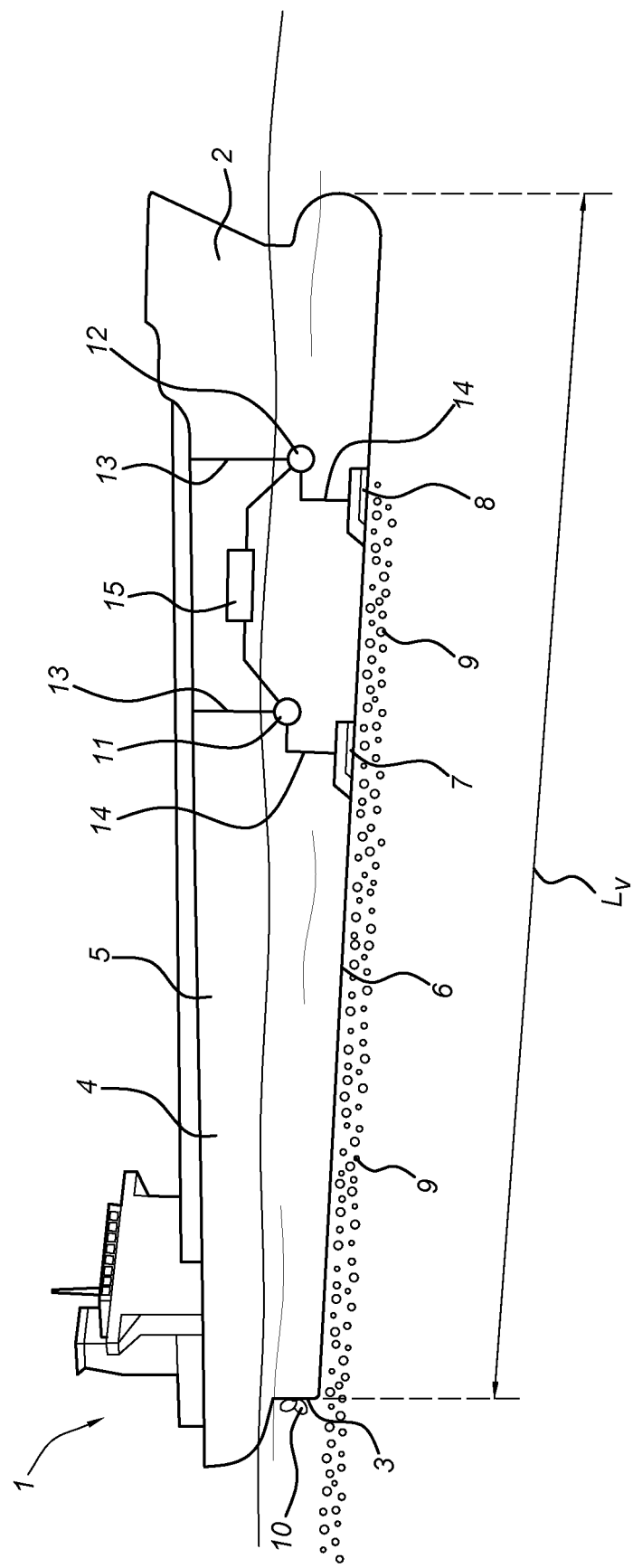
FIG. 1 shows a schematic side view of a vessel comprising an air lubrication system according to the invention.

FIG. 1 shows a vessel 1 having a length Lv of between 20 m and 500 m, and a width between 5 m and 75 m. The vessel 1 may have a water displacement of at least 10000 ton, preferably at least 50000 ton and is an ocean-going vessel. The vessel 1 has a hull 4 with a bow 2, a stern 3, sides 5 a substantially flat bottom 6 and a propeller 10. Air lubricating cavities 7, 8 that are open in the plane of the bottom 6, are distributed along the bottom 6 to generate a layer of bubbles 9 travelling in the boundary layer along the flat bottom 6, towards the stern 3. Compressors 11, 12 are connected to each cavity 7, 8 for supplying air at least at the hydrostatic pressure inside each cavity at the prevailing draught level of the vessel. The compressors 11, 12 are with an air outlet duct 14 connected to the cavities 7, 8 and have an air inlet duct 13 for taking in ambient air. The compressors 11, 12 are controlled by a controller 15, for regulating the air supply in dependence of the sailing speed, sea state and during starting and stopping.

Figure 2:
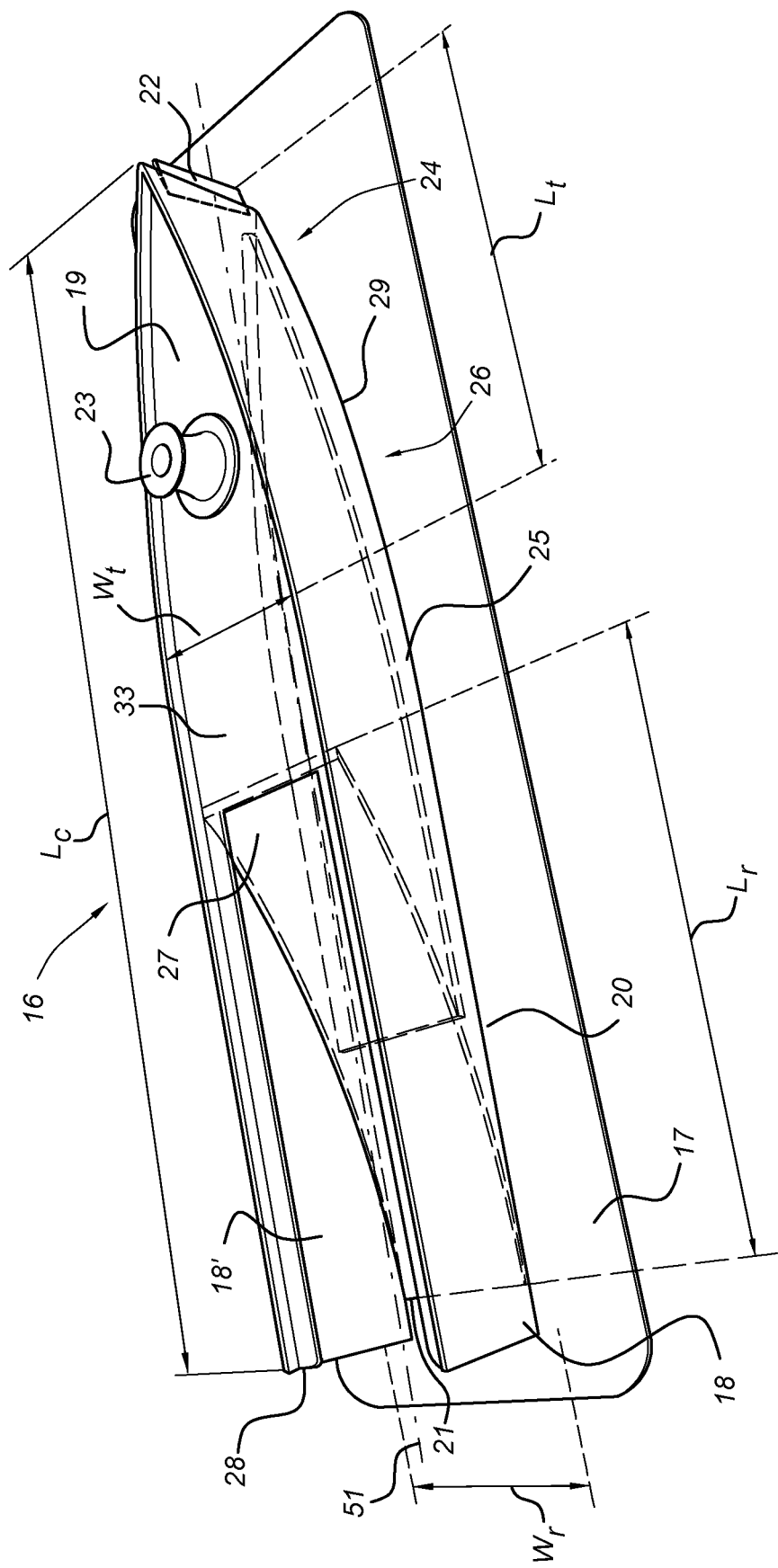
FIG. 2 shows a perspective view of an air release unit, or cavity unit comprising diverging sidewalls.

FIG. 2 shows an air lubrication system 16 that is constructed as an integral module forming a cavity 33 that can be fitted into the bottom 6 of the hull 4 of vessel 1. The system 16 comprises sidewalls 18, 18' that extend from a front end 22 to a rear end 28 in a length direction along the center line 51. A top wall 19 extends across the sidewalls at their upper edge, defining the cavity 33. The sidewalls 18, 18' are supported with a lower edge 29 on a flange 17 that can be welded into the flat bottom 6 of the vessel 1. The sidewalls 18, 18' delimit an opening 20 that is substantially level with the flat bottom surface of the vessel. In use, the opening 20 forms a smooth air-water interface plane in which air is mixed into the water due to the Kelvin Helmholtz mixing effect. Air bubbles that are mixed with the water at the interface plane leave the cavity along rear edge 21 to pass in a smooth transition from the cavity onto the downstream flat bottom section and travel unrestricted in the boundary layer along the flat bottom 6 in the direction of the stern 3. A concavely curved, downwardly sloping rear wall part 27 extends over a length Lr of about 1.5 m from the top wall 19 to the rear edge 21 to guide the air and water inside the cavity in a smooth flow pattern to the exit point situated along lower rear edge 21.

Near the front end 22 of the cavity 33 a dagger-shaped nose section 24 is provided that extends along a length Lt from the front end 22 to a transition zone 26. From the transition zone 26, the sidewalls 18, 18' diverge in a rearward direction to the rear end 28. An air inlet 23 is situated in the top wall 19. The air inlet 23 can be connected to one of the air outlet ducts 14 of the compressors 11, 12.

Inside the cavity 33, a deflector 25 extends across the largest part of the opening 20 at a small distance of between 1 cm and a few cm from the sidewalls 18, 18'. The length Lc of the cavity 33 may be about 4 m, the length Lt may be about 1 m, the width Wr at the rear being about 1 m, the with Wt at the transition zone 26 being about 50 cm and the height Hc being about 50 cm. The sidewalls 18, 18' may have a thickness of 16 mm, whereas the flange 17 and top wall 19 may have a thickness of 20 mm.

The deflector 25 inside the cavity 33 stabilizes the water flow inside the cavity. This is important because the deflector enables filling of the cavity with air during start-up of the vessel and prevents the cavity from being filled with water, for instance due to waves. Secondly, the deflector 25 minimizes resistance of the cavity while the air lubrication system 16 is switched off (without air output).

The deflector 25 is positioned above the interface plane of the cavity for obtaining an undisturbed flow of water passing the cavity during sailing speed of the vessel. When the cavity 33 is filled with air, the deflector 25 is clear of the water surface. The deflector helps maintaining the Kelvin Helmholtz interface stable during roll motions of the vessel.

The slope at the rear wall 27 of the cavity 33 warrants a smooth release of the air bubbles into the boundary layer of the vessel and is designed to inject the bubbles that are formed by Kelvin Helmholtz mixing into the vessel surface boundary layer, minimizing vertical dispersion and optimizing drag reduction.

The shape of the nose section 24 of the cavity 33 controls water flow and minimizes wave instability at the air/water interface and improves consistent air mixing into the boundary layer by the Kelvin Helmholtz effect.

The length Lc of the cavity 33 is chosen sufficiently long, for instance about 4 m, to create a stable Kelvin Helmholtz air mixing effect for constant air bubble generation and flow of air bubbles into the boundary layer.

The relative positioning of multiple cavities 33 across the bottom 6 is important to maximize the air-lubricated surface area of the hull.

The size of the cavity determines both the volume of air required for stable air bubble generation and for recovery of the cavity after the air pocket collapses. Optimizing the size of the cavity determines the overall lubrication effectiveness and the efficiency of the total air lubrication.

Figure 3:
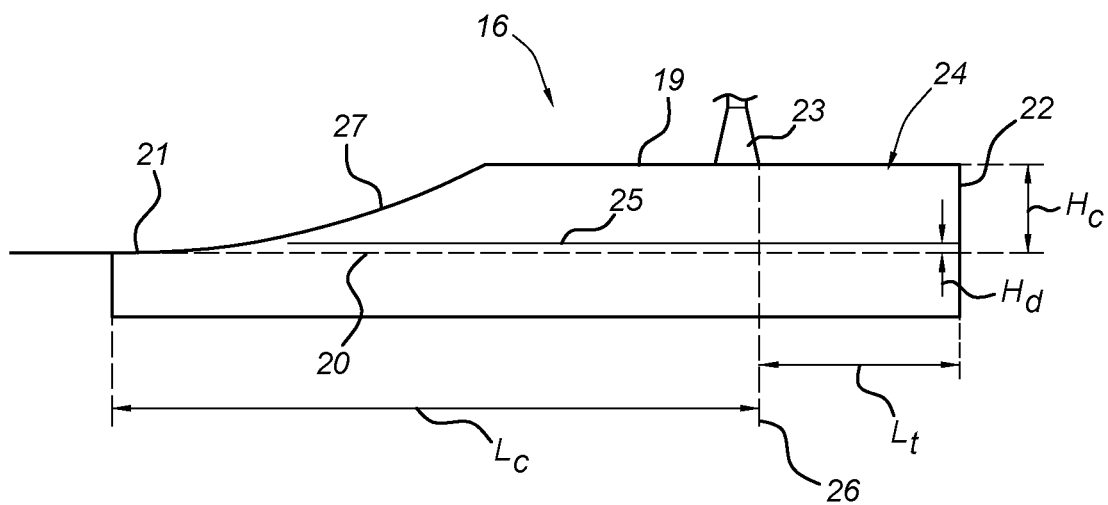
FIG. 3 shows a side view of a cavity unit according to the invention.

FIG. 3 shows the air lubrication system 16 in side view. The height Hc of the cavity from the interface plane 20 to the top wall 19 may be about 45 cm. A height Hd of the deflector 25 from the interface plane 20 may be for instance 5 cm. The length Lc of the cavity from the front end 22 to the rear edge 21 may be 4 m. The distance Lt of the transition zone 26 from the front end 22 may be about 1 m. The inlet 23 is positioned near the transition zone 26.

Figure 4:
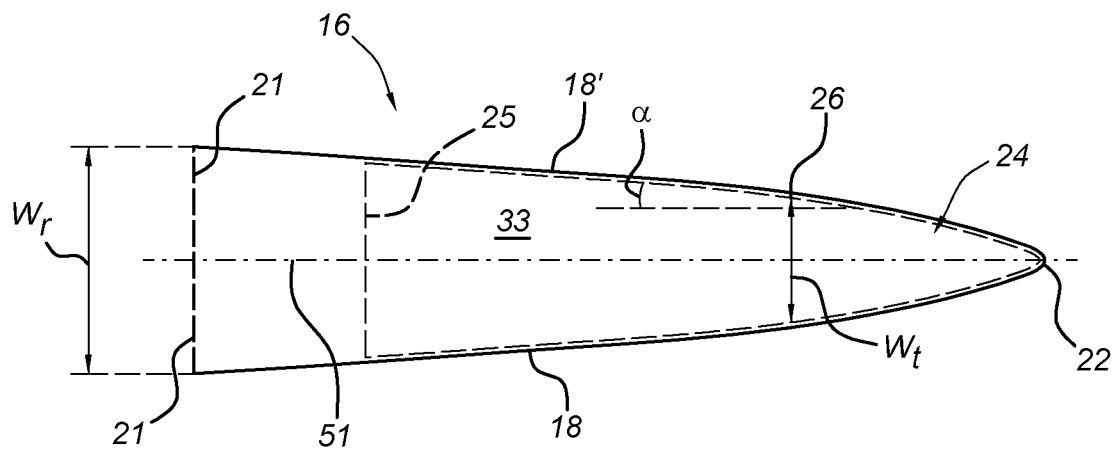
FIG. 4 shows a top view of a cavity unit according to the invention.

FIG. 4 shows a top view of the air lubrication system with the edges of the deflector 25 indicated by the dashed lines. The sidewalls 18, 18' extend from the transition zone 26 in the rearward direction at a diverging angle α of for instance about 5° to a centre line 51 of the cavity 33 and to any line parallel to this center line 51. The angle α may lie in the range of 2°-10°, preferably 2°-8°, more preferably 4°-7°, depending on the hull structure. The rear width Wr of the cavity at the end of the sidewalls 18, 18' may be about 1 m. A width Wt of the cavity at the transition zone 26 may be about 50 cm.

The diverging sidewalls 18, 18' that are placed at the angle α of up to about 10°, result in a diverging air blanket across the bottom, thus providing the possibility of reducing the number air lubrication systems and adequately covering the bottom of the hull with air bubbles using reduced amounts of air. At a given hull structure, the cavity design is such that the angle α is as large as possilble for obtaining an optimal air lubrication.

The rear edges of the diverging sidewalls 18, 18' at the rear end 28 prevent the formation of vortices, so that air lubrication stability is improved and frictional resistance is lowered.

Figure 5:
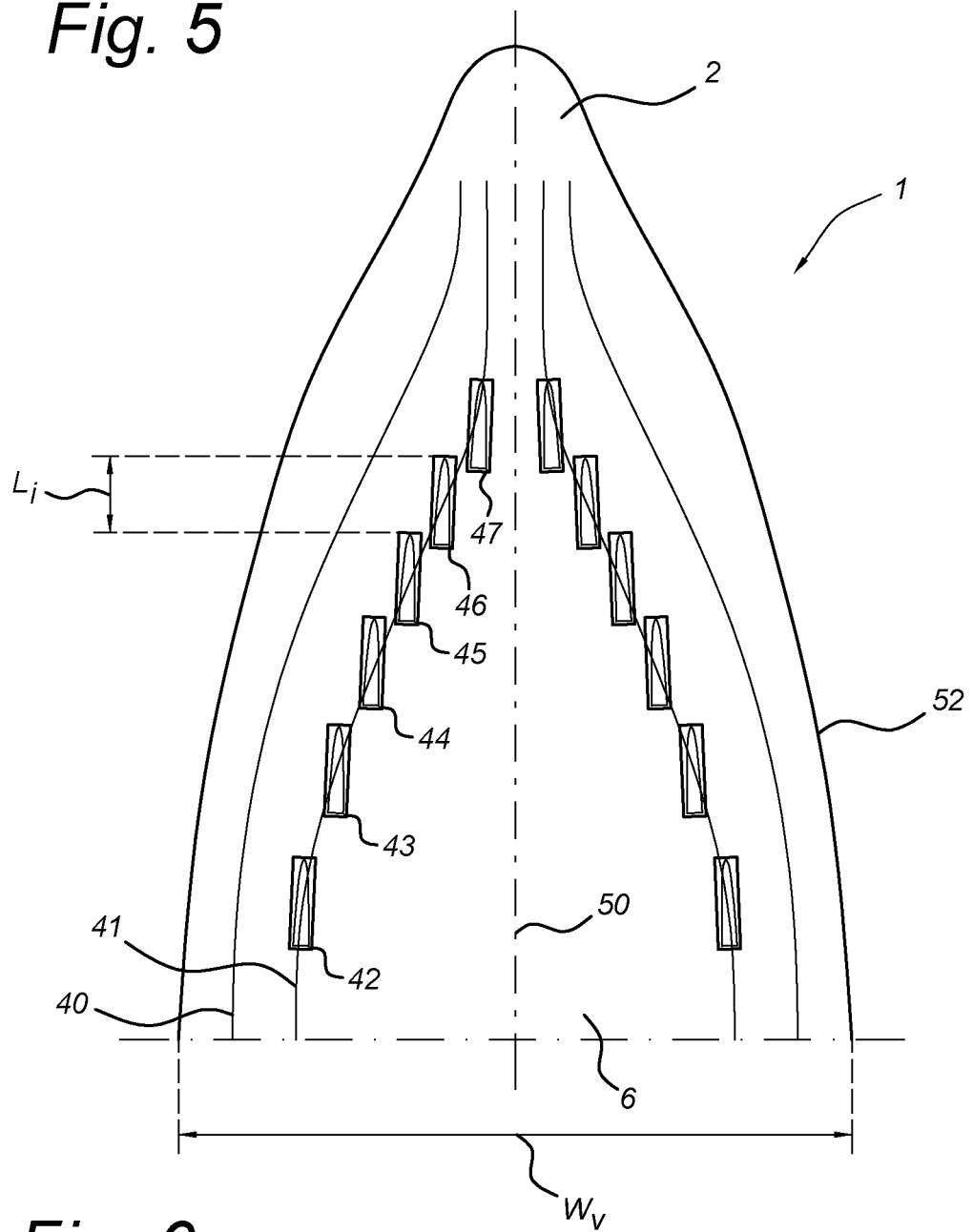
FIG. 5 shows a plan view of a bottom part of a vessel comprising a number of air lubricating cavities according to the invention, and FIG. 6 schematically shows the position of the cavity relative to a streamline.

FIG. 5 shows the bottom 6 of the vessel 1 and streamlines 40, 41 along which the water flows from the bow 2 to the stern. A number of cavities 42-47 extends at different positions along the width Wv of the vessel, that may amount to for instance 20 m, in a v-shaped distribution that fans out sideways from the vessel's centre line 50. The centre lines of the cavities need not be accurately aligned along the streamlines 40, 41. Because of the diverging sidewalls, the distance Li between two adjacent cavities 45, 46, when seen in the vessel's length direction, can be relatively large such as 1-3 m longer than the cavity length, for instance 4 m-7 m or more.

Figure 6:
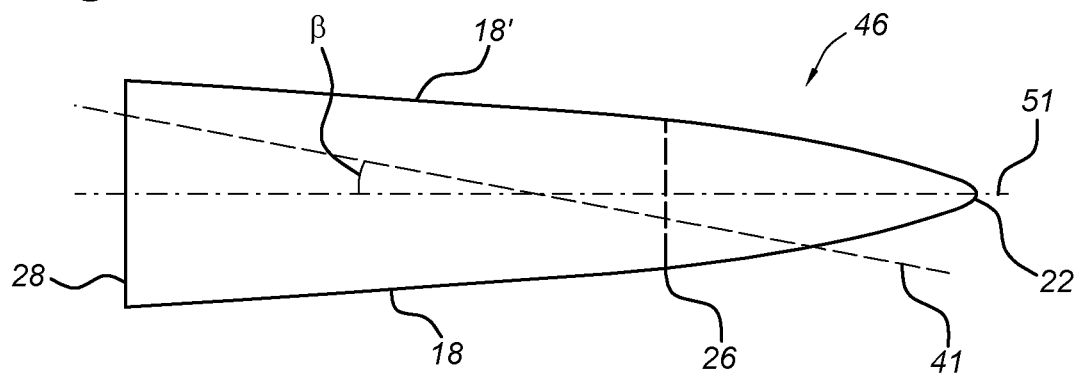

FIG. 6 shows a cavity 16 that is placed with its centre line 51 at an angle β of between 0.01° and 7° to the streamline 41. In the hull design, the angle β is smaller than angle α and is preferably chosen such that streamlines that intersect the cavity at the front end, leave the cavity at the aft, preferably between the sidewalls 18, 18' along the rear end 28.

The invention claimed is:

1. A vessel comprising a hull with a bottom and an air lubricating system for providing an air lubricating layer between the bottom and water flowing along the bottom as the vessel is moving through the water, the system comprising a plurality of cavities, each cavity defined by sidewalls, a top wall and an interface plane that is situated at a distance Hc from the top wall and that extends transversely to the sidewalls substantially at the level of the bottom and an air inlet spaced from the interface plane, each cavity having a front end, a rear end, a length Lc extending in a length direction of the cavity and at the cavity's rear end, a width Wr, wherein the sidewalls extend from a nose section at the front end, in which the sidewalls touch, to a transition zone that is situated at a distance Lt from the front end, the sidewalls between the rear end and the transition zone extending at an angle of from 2 to 10 degrees relative to the length direction of the cavity such that a distance between the sidewalls increases along the length of the cavity when going in a rearward direction.

2. The vessel according to claim 1, wherein the transition zone is situated at a distance Lt of between 1 m and 2 m from the front end.

3. The vessel according to claim 1, wherein the nose section is substantially V-shaped or dagger-shaped.

4. The vessel according to claim 1, wherein the bottom is substantially flat.

5. The vessel according to claim 1, wherein the air inlet is provided in the top wall, at a length position that substantially corresponds to the position Lt of the transition zone.

6. The vessel according to claim 1, wherein a distance Wr between the sidewalls near the rear end is between 70 cm and 150 cm, and wherein a distance Wt between the sidewalls at the transition zone is between 40 cm and 70 cm.

7. The vessel according to claim 1, the rear wall of the cavity sloping downward from the top surface to be tangential with the interface plane over a rear wall length Lr of between 50 cm and 2 m.

8. The vessel according to claim 1, wherein a deflector is situated substantially parallel to the interface plane at a distance Hd of between 1 cm and 50 cm from the interface plane, the deflector having sidewalls substantially parallel to the sidewalls of the cavity and extending at a distance of between 1 cm and 10 cm from the sidewalls.

9. The vessel according to claim 1, the vessel comprising streamlines along the vessel's bottom, and comprising on each side of a center line two or more cavities, at different width positions across the bottom, each cavity being situated with the cavity's length direction at an angle to the streamline at the position of the cavity, of between $0.01°$ and $7°$.

10. The vessel according to claim 1, comprising two cavities at different length positions of the bottom, wherein seen in the length direction, a distance Li between the front ends of a forward cavity that is placed nearest to a bow of the vessel and an adjacent cavity that is placed nearer to the stern, is larger than between 1 and 5 times the cavity length Lc.

11. A cavity unit, comprising two opposed sidewalls having an upper edge and a lower edge, a top wall connected to the upper edge of the sidewalls and an interface plane at a distance from the top wall at or near the lower edge of the sidewalls, the cavity unit having a front end, a rear end and a length Lc extending in a length direction of the cavity, an air inlet spaced from the interface plane, a distance of the top wall from the interface plane Hc and a width at the cavity unit's rear end Wr, wherein the wherein the ratio Lc/Hc is in the range 7:1 to 13:1, the ratio Wr/Hc is in the range of 1.3:1 to 2.5:1 and the ratio Lc/Wr is in the range of 3.5:1 to 7:1, the length Lc being between 2 m and 10 m, wherein the sidewalls extend from a nose section at the front end, in which the sidewalls touch, to a transition zone that is situated at a distance Lt from the front end, the sidewalls between the rear position and the transition zone extending at an angle relative to the length direction such that a distance between the sidewalls increases along the length of the cavity unit when going in a rearward direction.

12. The cavity unit according to claim 11, wherein the transition zone is situated at a distance Lt of between 1 m and 2 m from the front end.

13. The cavity unit according to claim 11, wherein the nose section is substantially V-shaped or dagger-shaped.

14. The cavity unit according to claim 11, wherein the air inlet is provided in the top wall, at length position that substantially corresponds to the length position of the transition zone.

15. The cavity unit according to claim 11, wherein a distance Wr between the sidewalls near the rear end is between 70 cm and 150 cm, and wherein a distance Wt between the sidewalls at the transition zone is between 40 and 70 cm.

16. The cavity unit according to claim 11, the rear wall of the cavity sloping downward from the top surface to be tangential with the interface plane over a rear wall distance Lr of between 50 cm and 2 m.

17. The cavity unit according to claim 11, wherein a deflector is situated substantially parallel to the interface plane at a distance between 1 cm and 50 cm from the interface plane, the deflector having sidewalls substantially parallel to the sidewalls of the cavity and extending at a distance of between 1 cm and 10 cm from the sidewalls.

18. The vessel of claim 1, wherein the ratio Lc/Hc is in the range 6:1 to 15:1, the ratio Wr/Hc is in the range of 1.3:1 to 5:1 the ratio Lc/Wr is in the range of 3.5:1 to 7:1 and the length Lc is between 2 m and 10 m.

19. A vessel comprising a hull having a bow and a stern defining a center line of the vessel, with a bottom along which water flows in streamlines from the bow, the vessel comprising a plurality of air release cavities recessed into the hull to create air interface planes at which air bubble formation can occur, each cavity having an air inlet spaced from the interface plane and being defined by sidewalls that extend from a pointed front end to a flared rear end and which diverge continuously at an angle of greater than 2 degrees with respect to a centerline of the cavity.

20. The vessel according to claim 18, wherein cavities are positioned in the hull on either side of a centerline of the vessel, with the centerline of a cavity oriented such that a streamline of water passing the pointed front end will cross the interface plane and will exit from the flared rear end as a mixture of air bubbles with water at a position that lies between the centerline of the cavity and the sidewall.

* * * * *